United States Patent [19]

Bartholomew et al.

[11] 4,226,628

[45] Oct. 7, 1980

[54] CUPROUS COPPER AND/OR SILVER HALOPHOSPHATE GLASSES

[75] Inventors: Roger F. Bartholomew, Painted Post; William G. Dorfeld, Lindley; James A. Murphy, Painted Post; Joseph E. Pierson, Painted Post; Stanley D. Stookey, Painted Post; Paul A. Tick, Corning, all of N.Y.

[73] Assignee: Corning Glass Works, Corning, N.Y.

[21] Appl. No.: 61,901

[22] Filed: Jul. 30, 1979

[51] Int. Cl.$^2$ ................................. C03C 3/16
[52] U.S. Cl. ................... 106/47 R; 252/518; 252/514; 252/512; 423/306; 429/193
[58] Field of Search ............. 106/47 R; 423/306; 252/512, 514, 518; 429/193

[56] References Cited

U.S. PATENT DOCUMENTS

| | | | |
|---|---|---|---|
| 3,853,568 | 12/1974 | Chvatal | 106/47 R |
| 3,875,321 | 4/1975 | Gliemeroth | 106/DIG. 6 |
| 4,038,203 | 7/1977 | Takahashi | 106/47 R |
| 4,079,022 | 3/1978 | Ferrarini et al. | 106/308 B |

OTHER PUBLICATIONS

Rindone, G. E. et al., "Glasses As Electrolytes in Galvanic Cells: Silver Glasses"-J. Am. Cer. Soc. 33, (1950), pp. 91-95.

Primary Examiner—Helen M. McCarthy
Attorney, Agent, or Firm—Clinton S. Janes, Jr.

[57] ABSTRACT

This invention is related to the production of glasses having compositions within the copper and/or silver-halide-phosphate field, wherein at least one halide is present selected from the group of fluoride, chloride, bromide, and iodide, such glasses exhibiting softening points below about 400° C., coefficients of thermal expansion (25°–300° C.) in excess of about $180 \times 10^{-7}/°C.$, high electrical conductivity, and electrochromic behavior. The copper-containing glasses may also demonstrate thermochromic properties.

7 Claims, 14 Drawing Figures

CUPROUS COPPER AND/OR SILVER HALOPHOSPHATE GLASSES

BACKGROUND OF THE INVENTION

Most inorganic glasses at room temperature typically demonstrate values of electrical resistivity well in excess of $10^8$ ohm cm. However, it has long been recognized that a transparent membrane with high ionic conductivity would have considerable value. Thus, glasses with low electrical resistivities can have utility in electrochemical devices which demand high ionic conductivity.

The high ionic conductivity of copper and silver ions is well-known and glasses containing those ions have been formulated. Nevertheless, this prior research has not fully exploited the full capability of such glasses. For example, such glasses may exhibit an electrochromic phenomenon due to the electrochemical reduction of the copper and/or silver ions to the respective metal.

SUMMARY OF THE INVENTION

The present invention is founded in the discovery that glasses having compositions within the copper and/or silver-halide-phosphate system, wherein at least one halide is selected from the group of fluoride, bromide, chloride, and iodide, can be produced which have low softening points, high coefficients of thermal expansion, and which may have high conductivity and exhibit electrochromic behavior. The copper-containing glasses may also demonstrate thermochromic characteristics. Thus, such glasses have softening points below 400° C. and, in some instances, below 150° C. The coefficients of thermal expansion (25°–300° C.) are generally in excess of $180 \times 10^{-7}/°$ C. and, hence, approximate those of certain metals. The glasses demonstrate electrical resistivities less than $10^8$ ohm cm. at room temperature ($\sim 25°$ C.), preferably less than $10^7$ ohm cm, with certain compositions ranging down to less than $10^3$ ohm cm. Finally, the glasses can exhibit electrochromism based upon their high ionic conductivity.

Electrochromism is the change in color of an electrode due to the passage of electric current. Color is typically produced electrochemically via the reduction of an ion to the metal at the cathode or a change in oxidation state of a colorless ion to a colored ion at the cathode or anode. In the darkened state the charge is stored electrochemically, i.e., the system is the charged state of a battery. Fading of the color is promoted by shorting the electrodes or by reversing the d.c. field. If the electrodes are shorted, the driving force for fading is the internal EMF of the battery and, consequently, will typically be slow. However, if a reverse field of the same magnitude as that utilized to cause darkening is applied, then fading will be more rapid than darkening since the internal EMF of the system adds to the applied EMF.

Figure 1:
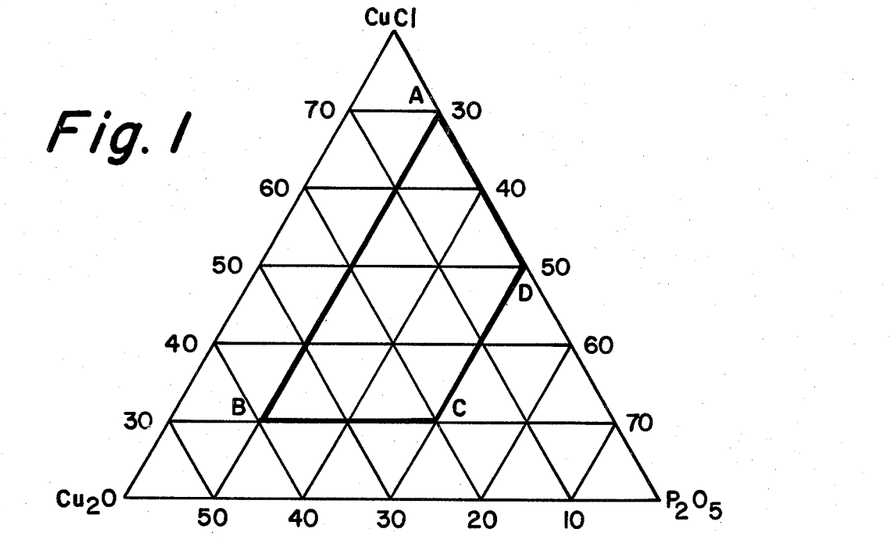
FIG. 1 constitutes a ternary composition diagram illustrating the area of stable glasses demonstrating an electrical resistivity at 25° C. of less than $10^8$ ohm cm produced in the $Cu_2O$-CuCl-$P_2O_5$ system.
Figure 2:
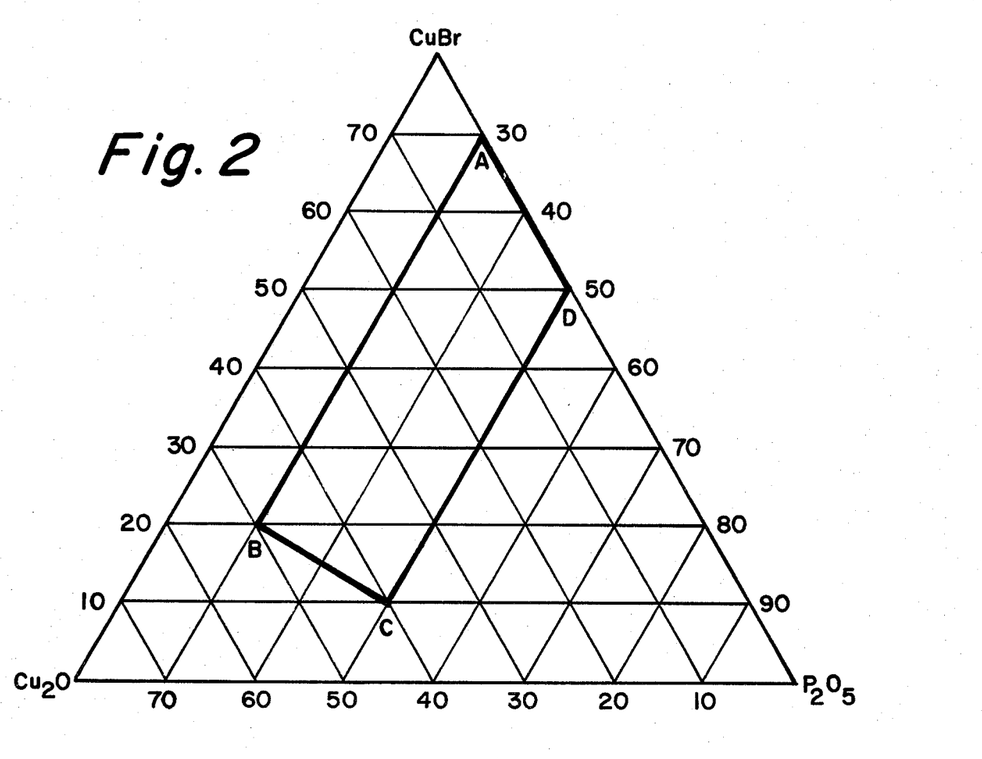
FIG. 2 constitutes a ternary composition diagram illustrating the area of stable glasses demonstrating an electrical resistivity at 25° C. of less than $10^8$ ohm cm produced in the $Cu_2O$-CuBr-$P_2O_5$ system.
Figure 3:
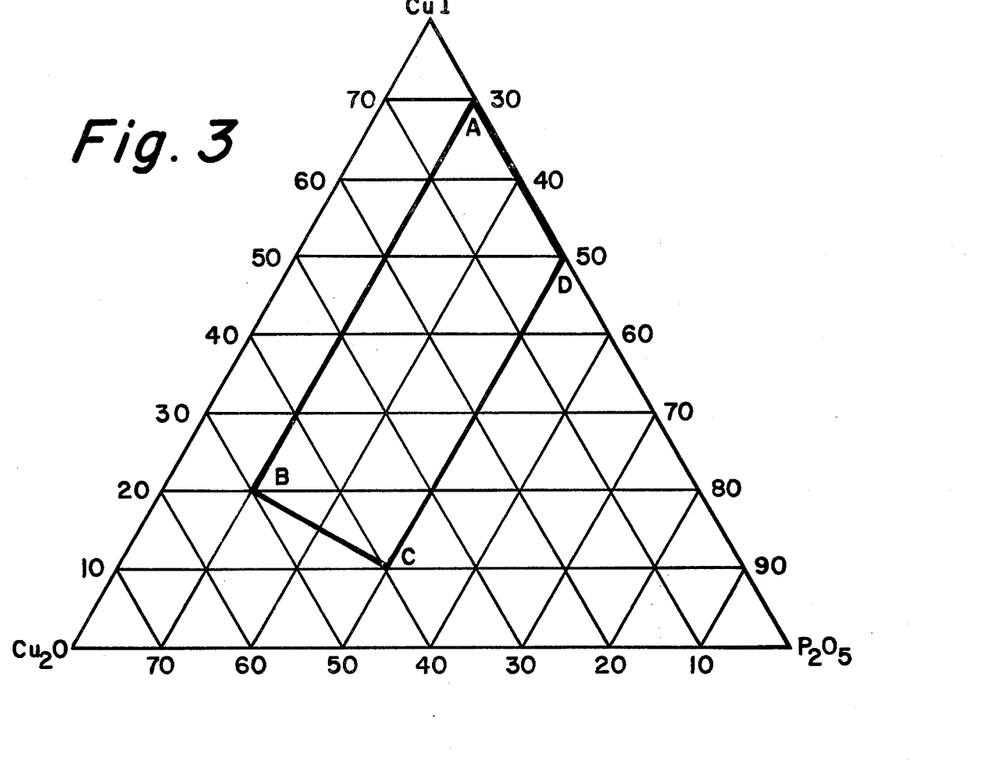
FIG. 3 constitutes a ternary composition diagram illustrating the area of stable glasses demonstrating an electrical resistivity at 25° C. of less than $10^8$ ohm cm produced in the $Cu_2O$-CuI-$P_2O_5$ system.

FIGS. 1, 2, and 3 constitute ternary composition diagrams illustrating the areas of stable glasses which have been produced in the $Cu_2O$-$CuCl$-$P_2O_5$, the $Cu_2O$-$CuBr$-$P_2O_5$, and the $Cu_2O$-$CuI$-$P_2O_5$ system, respectively. Hence, in each diagram, transparent, stable glasses exhibiting a light yellow to amber color and demonstrating an electrical resistivity at 25° C. of less than $10^8$ ohm cm are depicted within the area delimited ABCD expressed in weight percent as calculated from the batch.

In FIG. 1, points A, B, C, and D have the approximate values recited below:

A=0% $Cu_2O$, 70% CuCl, 30% $P_2O_5$

B=40% $Cu_2O$, 30% CuCl, 30% $P_2O_5$

C=20% $Cu_2O$, 30% CuCl, 50% $P_2O_5$

D=0% $Cu_2O$, 50% CuCl, 50% $P_2O_5$

Glass compositions containing less than 30% CuCl were quite dark in color and showed electrical resistivities in excess of $10^8$ ohm cm. Compositions wherein the $P_2O_5$ content exceeded 50% were poorly durable and also exhibited electrical resistivities greater than $10^8$ ohms. Compositions having less than 30% $P_2O_5$ proved to be unstable with regard to devitrification. As can be seen, good stable glasses of high conductivity can be formed on the CuCl-$P_2O_5$ binary.

In FIG. 2, points A, B, C, and D have the approximate concentrations reported below in weight percent:

A=0% $Cu_2O$, 70% CuBr, 30% $P_2O_5$

B=50% $Cu_2O$, 20% CuBr, 30% $P_2O_5$

C=40% $Cu_2O$, 10% CuBr, 50% $P_2O_5$

D=0% $Cu_2O$, 50% CuBr, 50% $P_2O_5$

Most of these glasses appeared to be somewhat lighter in color than the corresponding glasses containing CuCl. This phenomenon is believed to indicate less sensitivity to redox conditions in the melt. The same parameters were used to judge satisfactory glasses as were used with the CuCl-containing glasses. Acceptable glasses were found at higher $Cu_2O$ levels than were seen in the $Cu_2O$-CuCl-$P_2O_5$ system.

In the FIG. 3, points A, B, C, and D have the following approximate compositions in weight percent:

A=0% $Cu_2O$, 70% CuI, 30% $P_2O_5$

B=50% $Cu_2O$, 20% CuI, 30% $P_2O_5$

C=40% $Cu_2O$, 10% CuI, 50% $P_2O_5$

D=0% $Cu_2O$, 50% CuI, 50% $P_2O_5$

The composition ranges of suitable glasses were found to be essentially identical to those of the CuBr-containing glasses. Again, the same parameters were utilized to judge acceptable glasses as were used with the CuCl-containing glasses. In like manner to the CuBr and CuCl-containing glasses, good stable glasses demonstrating low electrical resistivities were found on the CuI-$P_2O_5$ binary.

It will be appreciated, of course, that a combination of two or three halides, may be present in the glass compositions.

Figure 4:
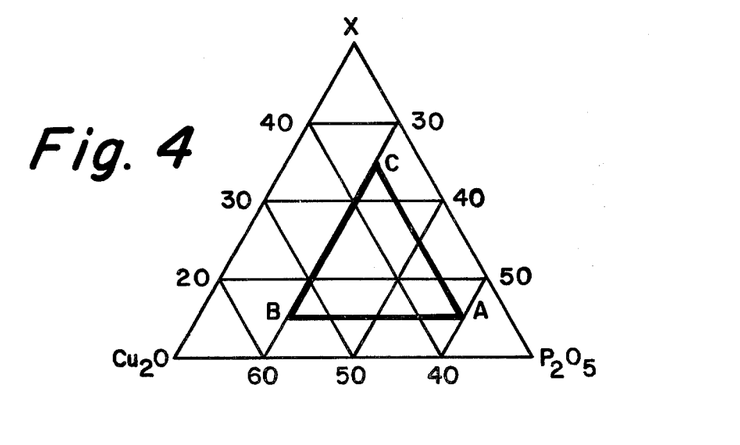
FIG. 4 constitutes a ternary composition diagram illustrating an area of stable glasses demonstrating an electrical resistivity at 25° C. of less than $10^8$ ohm cm produced in the $Cu_2O$-$P_2O_5$-X field, expressed in mole percent, wherein X is at least one halide selected from the group of Cl, Br, and I.

FIG. 4 illustrates that feature in that it constitutes a ternary composition diagram setting forth an area of stable glasses, expressed in terms of mole percent, demonstrating electrical resistivities at 25° C. of less than $10^8$ ohm cm which have been formed in the $Cu_2O$-$P_2O_5$-X system wherein X is at least one halide selected from the group of Cl, Br, and I. Points A, B, and C have the following approximate compositions in mole percent:

A = 35% $Cu_2O$, 50% $P_2O_5$, 15% X

B = 55% $Cu_2O$, 30% $P_2O_5$, 15% X

C = 35% $Cu_2O$, 30% $P_2O_5$, 35% X

The center of the scribed triangle is a point having the molecular formula $Cu_2O \cdot P_2O_5 \cdot \frac{1}{2}X$, where X is one or more of the group Cl, Br, and I.

FIGS. 5, 6, 7, 8, 9, 10, and 11 represent ternary composition diagrams illustrating the areas of stable glasses demonstrating electrical resistivities at 25° C. of less than $10^8$ ohm cm which have been formed in the $Ag_2O$-$AgCl$-$P_2O_5$, the $Ag_2O$-$AgBr$-$P_2O_5$, the $Ag_2O$-$AgI$-$P_2O_5$, the $Cu_2O$-$P_2O_5$-$F$, the $Cu_2O$-$P_2O_5$-$Cl/F$, the $Cu_2O$-$P_2O_5$-$Br/F$, and the $Cu_2O$-$P_2O_5$-$I/F$ system, respectively.

Figure 5:
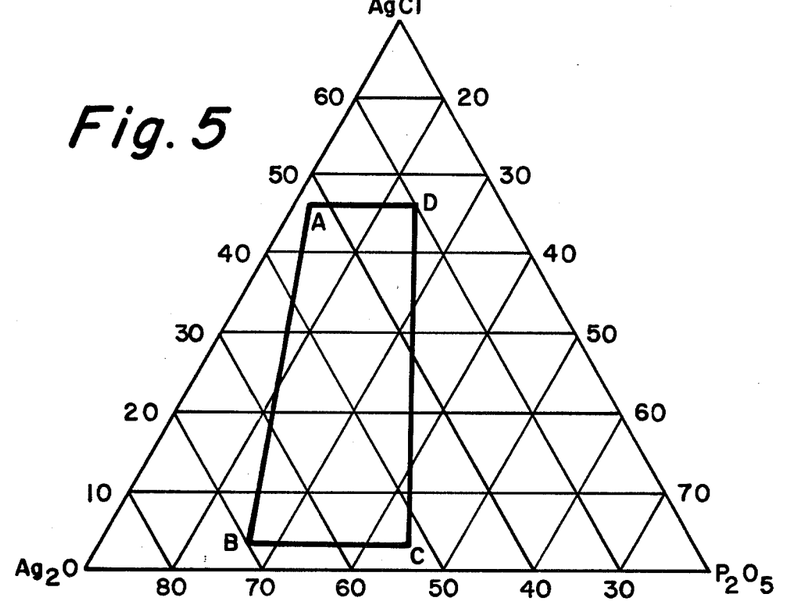
FIG. 5 constitutes a ternary composition diagram illustrating the area of stable glasses demonstrating an electrical resistivity at 25° C. of less than $10^8$ ohm cm produced in the $Ag_2O$-AgCl-$P_2O_5$ system.

In FIG. 5, points A, B, C, and D have the approximate values set out below in weight percent:

A = 42% $Ag_2O$, 46% AgCl, 12% $P_2O_5$

B = 73% $Ag_2O$, 3% AgCl, 24% $P_2O_5$

C = 52% $Ag_2O$, 3% AgCl, 45% $P_2O_5$

D = 30% $Ag_2O$, 46% AgCl, 24% $P_2O_5$

Although glasses free from chloride can be prepared which are ionic conducting and electrochromic, the durability and electrical conductivity thereof are significantly improved through the addition of chloride to the composition. Accordingly, a finite amount of chloride will be incorporated into the glass composition effective to improve those properties. In general, chloride in an amount of at least 1% will be included in the composition (1% Cl≡3% AgCl) with at least 5% being preferred.

Glasses within the area ABCD vary in color from colorless to a pale yellow, are quite fluid, can exhibit electrochromic behavior, and soften at temperatures between about 200°–400° C. Rather rapid cooling of the individual melts was necessitated since several thereof tended to devitrify upon slow cooling. Compositions containing excessive amounts of $P_2O_5$ formed glasses which were poorly durable and demonstrated electrical resistivities greater than $10^8$ ohm cm. The presence of $Ag_2O$ and/or AgCl in high quantities reduces the stability of the glass against devitrification.

Figure 6:
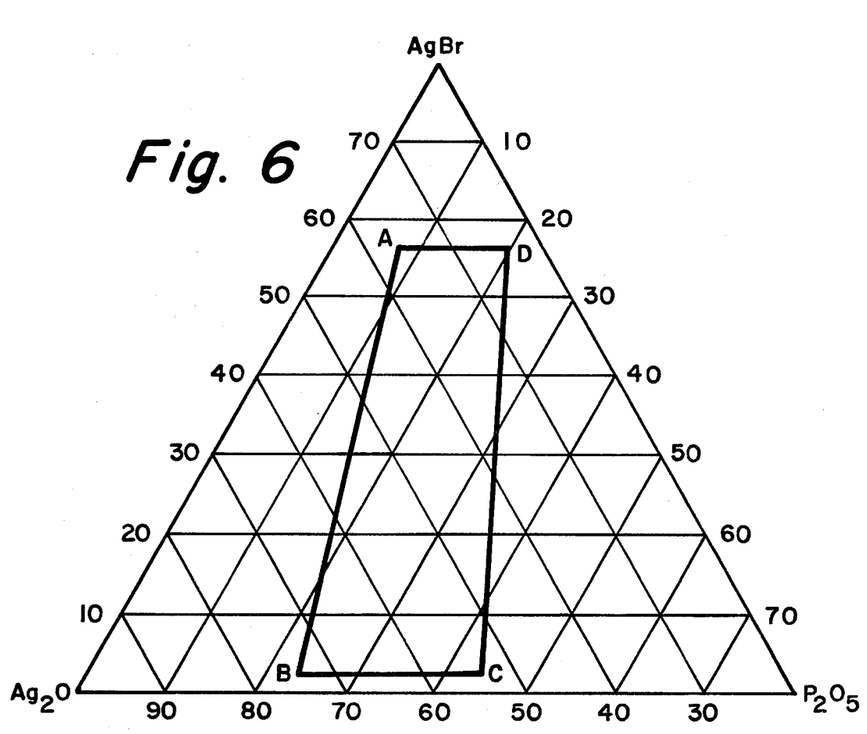
FIG. 6 constitutes a ternary composition diagram illustrating the area of stable glasses demonstrating an electrical resistivity at 25° C. of less than $10^8$ ohm cm produced in the $Ag_2O$-AgBr-$P_2O_5$ system.

In FIG. 6, points A, B, C, and D have the approximate values reported below in weight percent:

A = 36% $Ag_2O$, 56% AgBr, 8% $P_2O_5$ ps
B = 74% $Ag_2O$, 2% AgBr, 24% $P_2O_5$

C = 54% $Ag_2O$, 2% AgBr, 44% $P_2O_5$

D = 24% $Ag_2O$, 56% AgBr, 20% $P_2O_5$

Similarly to the AgCl-containing glasses discussed above, bromide is incorporated into the composition in an effective amount, usually at least about 1% (1% Br≡2% AgBr) with a minimum of 5% being preferred, to improve the durability and electrical conductivity of the glass. The glasses within area ABCD were pale yellow in color and, like the AgCl-containing glasses above, can exhibit electrochromic behavior, are quite fluid, and soften at temperatures below about 400° C. The same parameters were used to judge acceptable glasses as were used with the AgCl-containing glasses. Higher $Ag_2O$ levels were found operable than were seen in the $Ag_2O$-$AgCl$-$P_2O_5$ system glasses.

Figure 7:
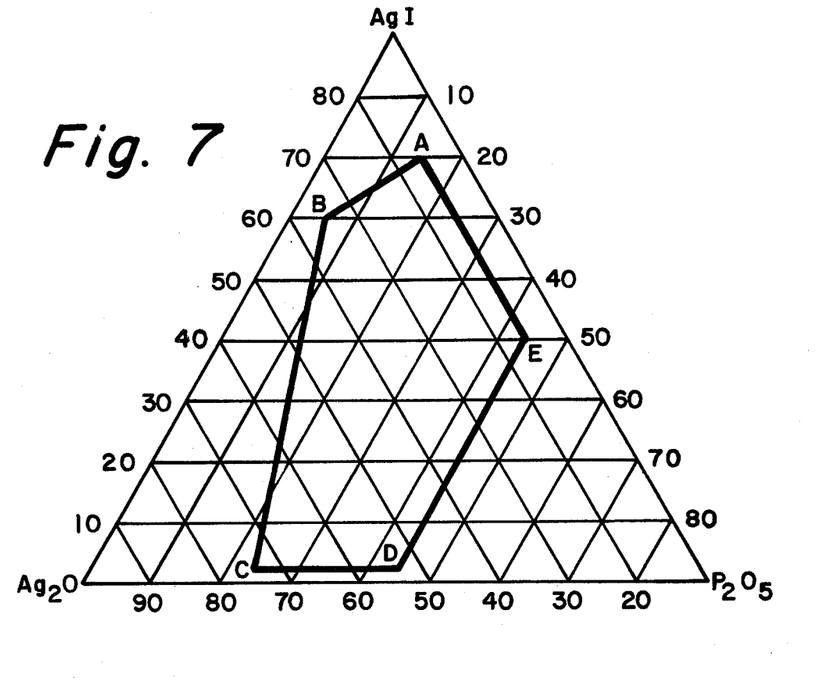
FIG. 7 constitutes a ternary composition diagram illustrating the area of stable glasses demonstrating an electrical resistivity at 25° C. of less than $10^8$ ohm cm produced in the $Ag_2O$-AgI-$P_2O_5$ system.

In FIG. 7, points A, B, C, D, and E have the following approximate compositions in weight percent:

A = 16% $Ag_2O$, 70% AgI, 14% $P_2O_5$

B = 35% $Ag_2O$, 60% AgI, 5% $P_2O_5$

C = 74.5% $Ag_2O$, 1.5% AgI, 24% $P_2O_5$

D = 53.5% $Ag_2O$, 1.5% AgI, 45% $P_2O_5$

E = 16% $Ag_2O$, 40% AgI, 44% $P_2O_5$

In like manner to the AgCl-containing glasses, iodide is included in the composition in an effective amount, typically at least about 1% (1% I≡1.5% AgI) with at least 5% being preferred, to enchance the durability and electrical conductivity of the glass. The glasses within area ABCDE were a darker yellow than the AgBr-containing compositions. Glasses still higher in AgI content were found to exhibit good ionic conductivity but were very dark brown in color and/or darkened in visible light. The same parameters were employed to judge satisfactory glasses as were used with the AgCl-containing glasses. Concentrations of AgI higher than either AgCl or AgBr are operable in the invention.

Figure 8:
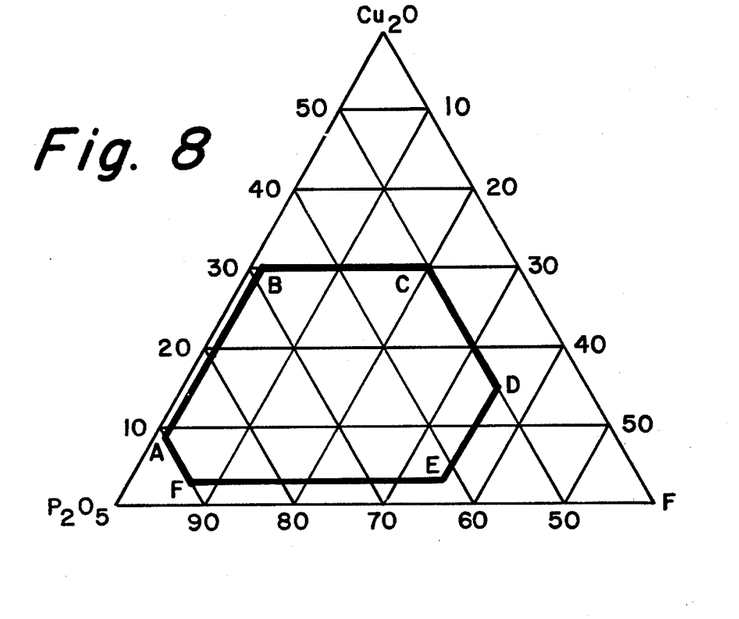
FIG. 8 constitutes a ternary composition diagram illustrating the area of stable glasses demonstrating an electrical resistivity at 25° C. of less than $10^8$ ohm cm produced in the $Cu_2O$-$P_2O_5$-F system.

In FIG. 8, points A, B, C, D, and E have the following approximate compositions in weight percent:

A = 90% $P_2O_5$, 9% $Cu_2O$, and 1% F

B = 69% $P_2O_5$, 30% $Cu_2O$, and 1% F

C = 50% $P_2O_5$, 30% $Cu_2O$, and 20% F

D = 50% $P_2O_5$, 15% $Cu_2O$, and 35% F

E = 62% $P_2O_5$, 3% $Cu_2O$, and 35% F

F = 90% $P_2O_5$, 3% $Cu_2O$, and 7% F

Glass compositions containing more than 90% $P_2O_5$ were so poorly durable as to be essentially useless from a practical point of view, whereas when less than 50% $P_2O_5$ was utilized the glasses were difficult to melt and/or unstable with respect to devitrification. The presence of fluoride improves the electrical conductivity of the simple $Cu_2O$-$P_2O_5$ glasses. However, the glasses exhibited a very dark green color.

It will be recognized that a combination of two or three halides may be present in the glass compositions. This is evidenced in FIGS. 9, 10, and 11.

Figure 9:
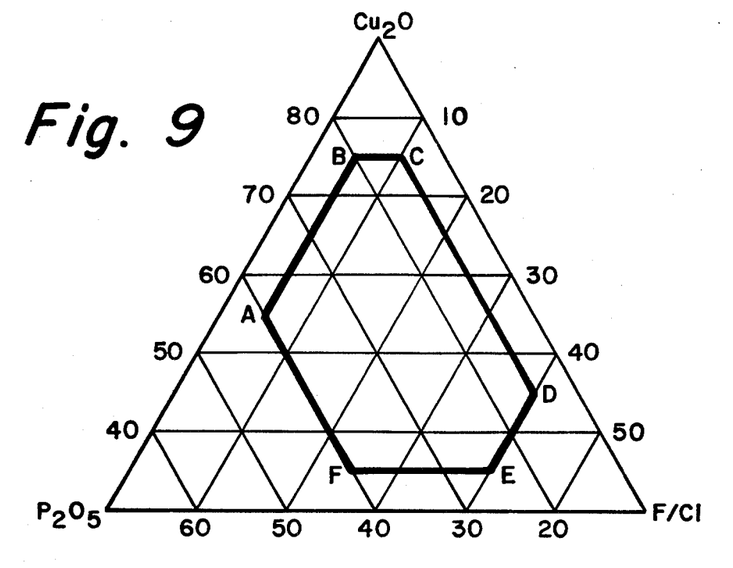
FIG. 9 constitutes a tenary composition diagram illustrating the area of stable glasses demonstrating an electrical resistivity at 25° C. of less than $10^8$ ohm cm produced in the $Cu_2O$-$P_2O_5$-F/Cl system.

FIG. 9 sets forth the operable composition area of the system $P_2O_5$-$Cu_2O$-$F/Cl$ in weight percent wherein the total F/Cl represents the sum of equal molar amounts of F and Cl. In FIG. 8, points A, B, C, D, E, and F have the following approximate compositions in weight percent:

A = 40% $P_2O_5$, 55% $Cu_2O$, 5% F/Cl

B = 20% $P_2O_5$, 75% $Cu_2O$, 5% F/Cl

C = 15% $P_2O_5$, 75% $Cu_2O$, 10% F/Cl

D=15% $P_2O_5$, 45% $Cu_2O$, 40% F/Cl

E=25% $P_2O_5$, 35% $Cu_2O$, 40% F/Cl

F=40% $P_2O_5$, 35% $Cu_2O$, 25% F/Cl

Less than about 15% $P_2O_5$ hazards glass instability. The glasses demonstrated colors ranging from light yellow, through amber, to a red amber appearance. The mixture of halide displays a very positive effect in lowering electrical resistivity when compared with any one alone. Thus, resistivities of less than $10^4$ ohm cm have been measured at room temperature.

Figure 10:
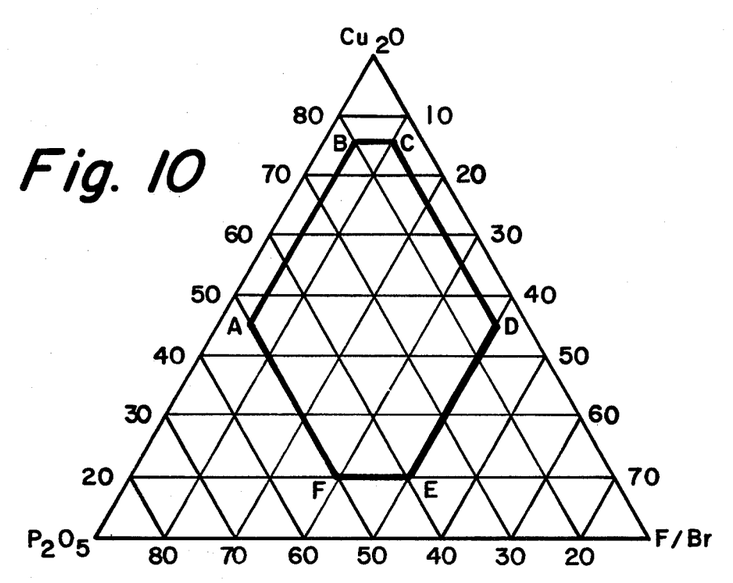
FIG. 10 constitutes a ternary composition diagram illustrating the area of stable glasses demonstrating an electrical resistivity at 25° C. of less than $10^8$ ohm cm produced in the $Cu_2O$-$P_2O_5$-F/Br system.

FIG. 10 reports the operable composition area of the system $P_2O_5$-$Cu_2O$-F/Br in weight percent. In like manner to F/Cl in FIG. 9, the expression F/Br represents the sum of equal molar amounts of F and Br. Points A, B, C, D, E, and F have the following approximate compositions in weight percent:

A=50% $P_2O_5$, 45% $Cu_2O$, 5% F/Br

B=20% $P_2O_5$, 75% $Cu_2O$, 5% F/Br

C=15% $P_2O_5$, 75% $Cu_2O$, 10% F/Br

D=15% $P_2O_5$, 45% $Cu_2O$, 40% F/Br

E=40% $P_2O_5$, 20% $Cu_2O$, 40% F/Br

F=50% $P_2O_5$, 20% $Cu_2O$, 30% F/Br

As was the case with the F/Cl compositions, glasses containing less than about 15% $P_2O_5$ are unstable with regard to devitrification. Also, the glasses exhibited coloration ranging from light yellow to red amber and electrical resistivities approaching $10^3$ ohm cm have been measured at room temperature.

Figure 11:
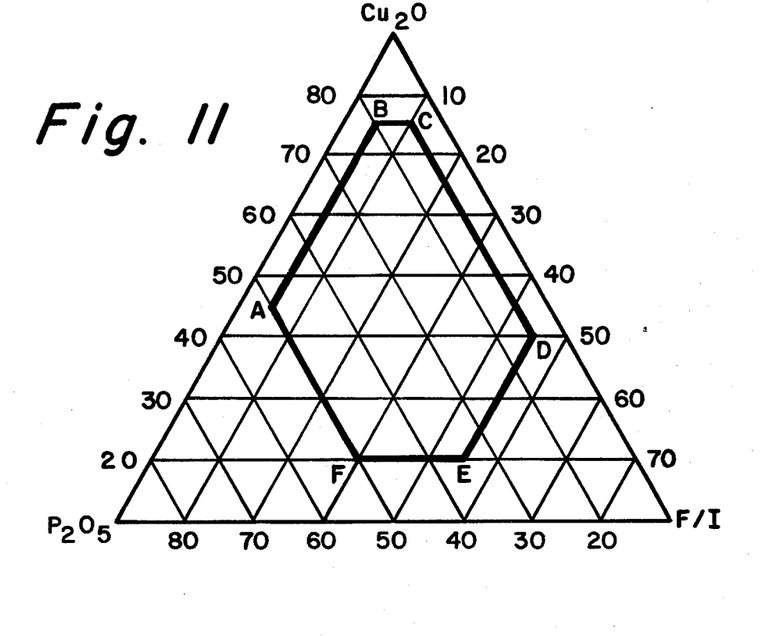
FIG. 11 constitutes a ternary composition diagram illustrating the area of stable glasses demonstrating an electrical resistivity at 25° C. of less than $10^8$ ohm cm produced in the $Cu_2O$-$P_2O_5$-F/I system.

FIG. 11 diagrams the operable composition area of the system $P_2O_5$-$Cu_2O$-F/I in weight percent. Similarly to F/Cl in FIG. 9 and F/Br in FIG. 10, the term F/I represents the sum of equal molar amounts of F and I. Points A, B, C, D, E, and F have the following approximate compositions in weight percent:

A=50% $P_2O_5$, 45% $Cu_2O$, 5% F/I

B=20% $P_2O_5$, 75% $Cu_2O$, 5% F/I

C=15% $P_2O_5$, 75% $Cu_2O$, 10% F/I

D=15% $P_2O_5$, 40% $Cu_2O$, 45% F/I

E=35% $P_2O_5$, 20% $Cu_2O$, 45% F/I

F=50% $P_2O_5$, 20% $Cu_2O$, 30% F/I

Yet again, at least about 15% $P_2O_5$ is necessary to provide against glass instability. The glasses were generally somewhat darker than the Cl and Br containing glasses, the colors varying from a light amber to dark brown. Also, the electrical resistivities measured at room temperature were not quite as low as the Cl and Br containing glasses. However, the values were generally less than where only one halide was incorporated into the glass compositions.

Furthermore, substitutions in part of copper for silver and vice versa can be made in each of the above groups of compositions outlined in FIGS. 1-11.

The electrochromic systems which appear to be of great present interest utilize a solid electrolyte and darken by the electrochemical reduction of an ion to the metal at the cathode or produce a transition metal ion that is colored in the reduced state. Those systems based upon the electrochemical reduction of an ion to the corresponding metal are more efficient because of the large optical absorption coefficient of metals.

In order to measure the properties of an electrochromic system, two transparent electrodes were placed on opposite sides of the electrochemical cell. This could be accomplished via R.F. sputtering of Sn-$In_2O_3$ or Sb-$SnO_2$ films. However, a more rapid and convenient system was devised wherein the electrochemical cell was sandwiched between two pieces of glass coated with Sb-$SnO_2$ films by chemical vapor deposition. This process has been described in such literature as U.S. Pat. Nos. 2,564,707 and 3,331,702. Such a system limits the capability of electrochromic measurements to solid electrolytes having low softening points but that is precisely the type of materials resulting from the present invention.

Optical transmission measurements are customarily made with a photodiode using white light. However, the visible spectrum of each system was studied spectrophotometrically.

The resistivities reported for solid ionic conductors are normally measured with a.c. current to preclude the occurrence of polarization. For an electrochromic system, however, darkening takes place via an electrochemical reaction, i.e., in the region of polarization. A typical current-voltage relationship existing for an electrochemical reaction is set forth in FIG. 12.

Figure 12:
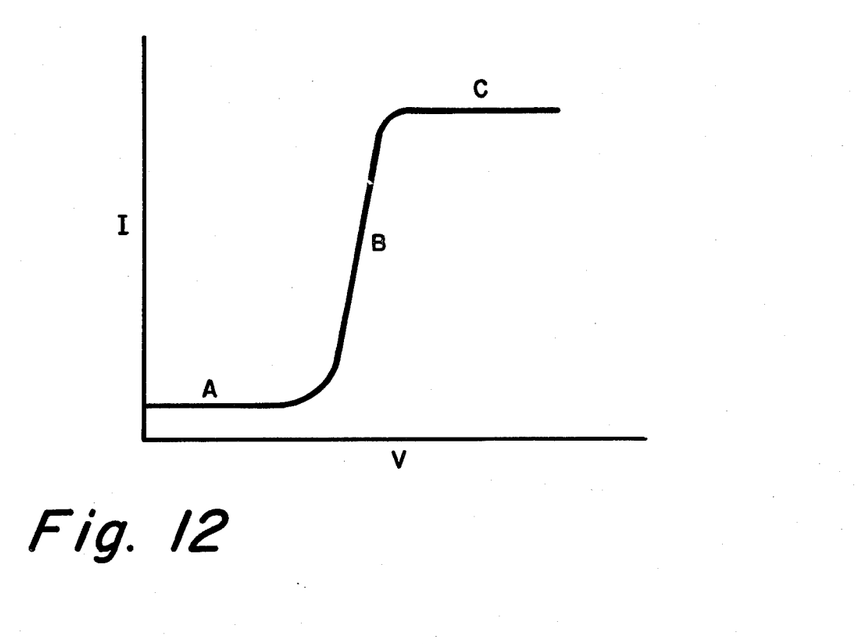
FIG. 12 sets forth a typical current-voltage relationship existing for an electrochemical reaction.

In region A of that FIGURE, little current is passed through the cell and no irreversible reactions take place. In region B, electrochemical oxidation and reduction commence. Region C denotes the electrochemical reactions taking place at the maximum rate for the system. Hence, it is in region C where the electrochromic system should be operated for maximum speed. Unfortunately, the current in region C is too great for the $Ag_2O$ and/or $Cu_2O$-halide-$P_2O_5$ system, thereby leading to degradation. Consequently, the glasses of the instant invention require operation in region B.

By the very nature of the system, i.e., alternating from the discharged to the charged and back to the discharged state of a battery, the resistivity of the cell is voltage dependent. Therefore, the system is best characterized by the current-voltage representation rather than by a single resistivity value.

The darkening due to the electrochemical reduction of $Ag^+$ $Ag°$ is fundamentally a very efficient reaction because of the large absorption coefficient of copper and silver. The transmission of an electrochromic system is represented by $$\ln(T/T_o) = -\frac{4\pi kd}{\lambda} \qquad \text{(Equation 1)}$$

where k is the absorption coefficient of the absorbing layer of thickness d at a wavelength λ.

Figure 13:
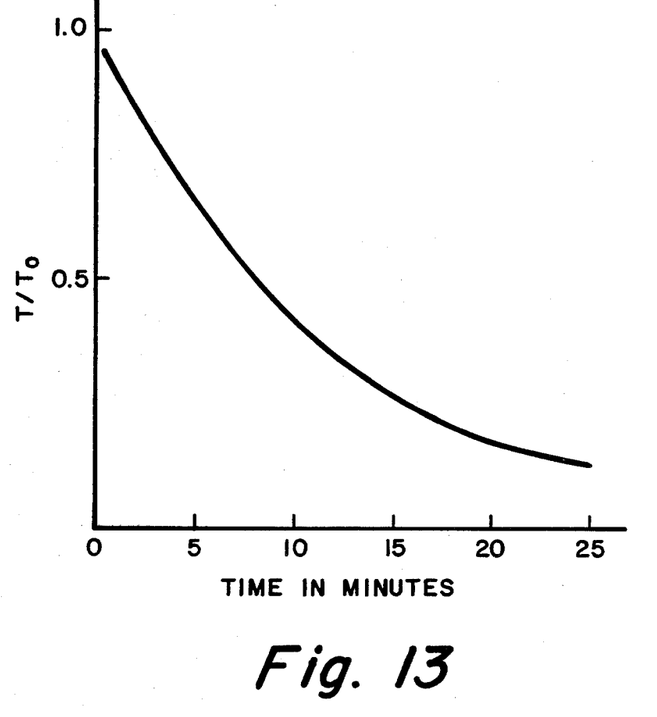
FIG. 13 represents the transmission-time relationship calculated for the silver system at a constant current of 1 ma/cm².

Utilizing silver as the example, λ=5600Å and k=3.75. In this manner, Equation 1 becomes $$\ln(T/T_o) = 0.0084d \qquad \text{(Equation 2)}$$

where d is the thickness of silver in Å. If the current efficiency of the system is assumed to be 100%, then the transmission can be calculated in terms of the amount of charge passed through the cell. Based upon that assumption, Equation 1 becomes $$\ln(T/T_o) = 89.6Q \quad \text{(Equation 3)}$$

where Q is delineated in coulombs. To achieve a transmission of 50%, less than 0.008 coulomb/cm² is required. This value corresponds to 8 seconds at a current of 1 ma/cm². FIG. 13 depicts the transmission-time relationship calculated for the silver system at a constant current of 1 ma/cm². Whereas Equations 1-3 were calculated at a wavelength of 5600 Å, actual spectra obtained of electrochromic cells of Ag-containing glasses in the darkened state manifest that the transmission is generally uniform across the visible spectrum within about 5%.

To reduce the transmission of the Ag-containing system to 50% requires 8.65 μg of Ag/cm². This amount of Ag is equivalent to depleting silver from the glass to a depth of about 235 Å. It is conjectured, however, that the Ag comes from a depth of several thousand angstroms within the glass and not just from an interface layer. Even reducing the transmission to 25% demands only about 17 μg of Ag/cm². This quantity of silver is less than 2.4% of that present in a 2 micron film of $Ag_2O \cdot AgCl \cdot P_2O_5$ glass. The thickness of the typical laminate structure used for measurements is greater than 1000 microns.

Figure 14:
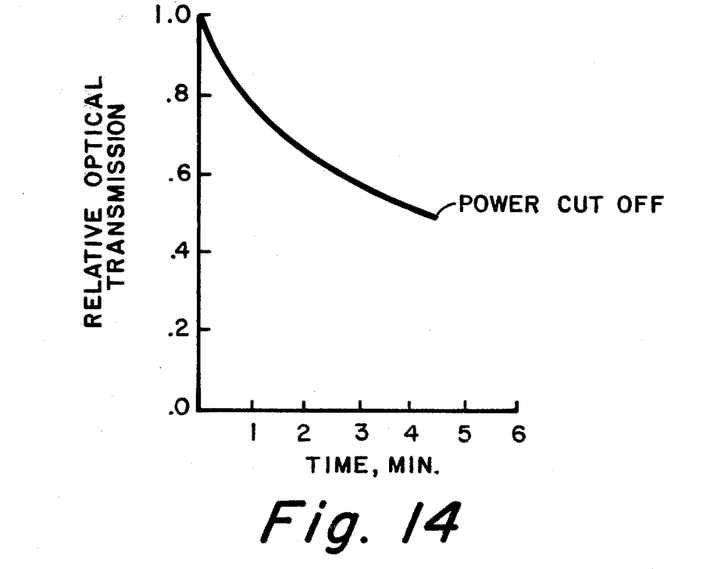
FIG. 14 graphically depicts the typical relative transmission: time relationship which a glass having a composition in the P₂O₅-Cu₂O-CuI field exhibits when subjected to a constant applied potential of one volt. The optical transmission is plotted in terms of relative units.

An electrochemical cell utilizing a cuprous halophosphate glass demonstrates a markedly different mechanism for electrochromic behavior. FIG. 14 illustrates the darkening in transmission exhibited by a glass consisting, by weight, of 40% $P_2O_5$, 20% $Cu_2O$, and 40% CuI when a field of one volt is applied thereacross. With this glass the darkening occurs at the anode of the device instead of the cathode, thereby indicating that the electrochemical reaction is the result of an oxidation rather than a reduction mechanism. The color of the darkened film is black, the appearance thereof being similar to that typical of the mixed valency copper oxide black used as optically absorbing coatings.

Although the complete details of the mechanism are not known, the summation of the anode reaction is believed to be:

This produces a region of glass at the anode where both cupric and cuprous ions exist, in contrast to the original glass where substantially all the copper is present as cuprous ions.

It is well recognized that a strongly allowed optical transition exists between the two valence states of copper leading to the development of copper oxide black, the intensity thereof being proportional to the product of the concentrations of the cupric and cuprous ion species. Consequently, when an electric field of sufficient magnitude is applied to a cuprous halophosphate glass, an optically absorbing film is produced at the anode via a mixed valency mechanism. Measurements on such glasses as that described above, viz., 40% $P_2O_5$, 20% $Cu_2O$, and 40% CuI, and 30% $P_2O_5$, 40% $Cu_2O$, and 30% CuBr have demonstrated that the darkening mechanism is electrically efficient, requiring on the order of 0.01-0.05 coulombs/cm² for significant darkening. FIG. 14 shows a darkening of about 50% after the application of one volt for about four minutes. That glass will fade back to its original transmission by simply removing the applied field. Thus, the glass will assume its original transmission at room temperature without requiring the application of a reverse field thereto. This fading can be expedited by exposure to slightly elevated temperatures.

It is believed that this same mechanism of mixed valency darkening is responsible for an additional phenomenon observed in the $Cu_2O$-$P_2O_5$-CuX glasses encompassed within the compositions defined in FIGS. 1-3, viz., thermochromic behavior. For example, a glass having a composition of 30% $P_2O_5$, 40% $Cu_2O$, and 30% CuBr will change its optical transmission by 50% when it is subjected to a temperature change from 70° C. to 25° C. The glass is more absorbing, i.e., it is darker in color, at the higher temperature. It will be appreciated that under these conditions the oxidation of cuprous ions is effected thermally and occurs throughout the glass rather than solely at an interface, as is the case with the electrochromic mechanism.

DETAILED DESCRIPTION OF THE INVENTION

Table I recites several compositions, expressed in weight percent on the oxide basis as calculated from the batch, of stable glasses coming within the quadrangle ABCD reported in FIG. 1. Table IA records the batch ingredients utilized, expressed in parts by weight.

Melting of the batch ingredients was conducted in covered crucibles, generally VYCOR® brand 96 percent silica crucibles, marketed by Corning Glass Works, Corning, New York, or glazed porcelain, at temperatures between about 70°-1100° C. for about 10-15 minutes. This melting practice, coupled with the character of the batch ingredients, provided a sufficiently reducing environment to insure that the copper was present in the glass in the cuprous state. The time for melting was kept short to avoid loss through volatilization. The molten batches were very fluid, even when cooled to 300°-400° C. The melts were poured onto a steel plate and a part thereof pressed to a thin plate having a thickness of 1 mm or less.

Table IB reports visual observations made on the glass specimens and electrical resistivity measurements made at room temperature by contacting the glass with probes from a Simpson 260 volt ohm milliammeter marketed by Simpson Electric Company, Elgin, Ill.

TABLE I

| Example No. | $P_2O_5$ | $Cu_2O$ | CuCl |
|---|---|---|---|
| 1 | 35 | 32.5 | 32.5 |
| 2 | 30 | 35 | 35 |
| 3 | 40 | 30 | 30 |
| 4 | 40 | 20 | 40 |
| 5 | 40 | 10 | 50 |
| 6 | 40 | 5 | 55 |
| 7 | 40 | — | 60 |
| 8 | 35 | — | 65 |

TABLE IA

| Example No. | $NH_4H_2PO_4$ | $Cu_2O$ | CuCl |
|---|---|---|---|
| 1 | 5.67 | 3.25 | 3.25 |
| 2 | 4.86 | 3.5 | 3.5 |
| 3 | 6.48 | 3 | 3 |
| 4 | 6.48 | 2 | 4 |
| 5 | 6.48 | 1 | 5 |
| 6 | 6.48 | 0.5 | 5.6 |
| 7 | 6.48 | — | 6 |
| 8 | 5.67 | — | 6.5 |

TABLE IB

| Example No. | Appearance | Surface Resistance (ohms × 10⁴) |
|---|---|---|
| 1 | Clear if quenched, crystalline if not | 300 |
| 2 | Clear dark amber glass | 500 |
| 3 | Black glass | 1000 |
| 4 | Clear amber glass | 400 |
| 5 | " | 1000 |
| 6 | " | 1000 |
| 7 | " | 2000 |

TABLE IB-continued

| Example No. | Appearance | Surface Resistance (ohms × 10⁴) |
|---|---|---|
| 8 | " | 40 |

Table II lists several compositions, expressed in weight percent on the oxide basis as calculated from the batch, of stable glasses coming within the quadrangle ABCD reported in FIG. 2. Table IIA reports the batch ingredients used, expressed in parts by weight.

Melting of the batch ingredients and forming of the molten batches were undertaken in like manner to the exemplary compositions of Table I. Table IIB recites visual observations noted on the glass samples along with electrical resistivity determinations made at room temperature utilizing a Simpson ohm-meter.

TABLE II

| Example No. | $P_2O_5$ | $Cu_2O$ | CuBr |
|---|---|---|---|
| 9 | 40 | 30 | 30 |
| 10 | 40 | 20 | 40 |
| 11 | 40 | 17.5 | 17.5 |
| 12 | 50 | 30 | 20 |
| 13 | 40 | 40 | 20 |
| 14 | 30 | — | 70 |
| 15 | 30 | 30 | 40 |
| 16 | 30 | 50 | 20 |
| 17 | 40 | — | 60 |
| 18 | 35 | 25 | 40 |
| 19 | 45 | 35 | 20 |
| 20 | 45 | 30 | 25 |
| 21 | 45 | 25 | 30 |
| 22 | 45 | 20 | 35 |
| 23 | 40 | 15 | 45 |
| 24 | 35 | — | 65 |

TABLE IIA

| Example No. | $NH_4H_2PO_4$ | $Cu_2O$ | CuBr | $H_3PO_4$(85%) |
|---|---|---|---|---|
| 9 | 6.48 | 3 | 3 | — |
| 10 | — | 2 | 4 | 6.52 |
| 11 | 7.29 | 1.75 | 3.75 | — |
| 12 | 8.10 | 3 | 2 | — |
| 13 | 6.48 | 4 | 2 | — |
| 14 | 4.86 | — | 2 | — |
| 15 | 4.86 | 3 | 4 | — |
| 16 | 4.86 | 5 | 2 | — |
| 17 | 6.48 | — | 6 | — |
| 18 | 5.67 | 2.5 | 4 | — |
| 19 | 7.29 | 3.5 | 2 | — |
| 20 | 7.29 | 3 | 2.5 | — |
| 21 | 7.29 | 2.5 | 3 | — |
| 22 | 7.29 | 2 | 3.5 | — |
| 23 | 6.48 | 1.5 | 4.5 | — |
| 24 | 5.67 | — | 6.5 | — |

TABLE IIB

| Example No. | Appearance | Resistivity (ohms × 10⁴) |
|---|---|---|
| 9 | Clear amber glass | 30 |
| 10 | Clear light amber glass | 70 |
| 11 | Clear amber glass | 2000 |
| 12 | " | — |
| 13 | " | 200 |
| 14 | " | 70 |
| 15 | Clear dark amber if quenched, crystalline if not | 10 |
| 16 | Clear dark amber if quenched, crystalline if not | 500 |
| 17 | Clear dark amber glass | 200 |
| 18 | Clear light amber glass | 10 |
| 19 | Clear amber glass | 1000 |
| 20 | " | 500 |

TABLE IIB-continued

| Example No. | Appearance | Resistivity (ohms × 10⁴) |
|---|---|---|
| 21 | " | 400 |
| 22 | " | 1000 |
| 23 | " | 100 |
| 24 | " | 70 |

Table III records several compositions, expressed in weight percent on the oxide basis as calculated from the batch, of stable glasses encompassed within the quadrangle ABCD outlined in FIG. 3. Table IIIA lists the batch ingredients utilized, expressed in parts by weight.

Melting of the batch ingredients and forming of the molten batches were conducted in similar fashion to the exemplary compositions of Table I. Table IIIB reports visual observations made on the glass samples along with electrical resistivity measurements determined via a Simpson ohm-meter.

TABLE III

| Example No. | $P_2O_5$ | $Cu_2O$ | CuI |
|---|---|---|---|
| 25 | 40 | 30 | 30 |
| 26 | 30 | — | 70 |
| 27 | 40 | — | 60 |
| 28 | 50 | — | 50 |
| 29 | 40 | 5 | 55 |
| 30 | 40 | 10 | 50 |
| 31 | 40 | 15 | 45 |
| 32 | 40 | 20 | 40 |

TABLE IIIA

| Example No. | $NH_4H_2PO_4$ | $Cu_2O$ | CuI |
|---|---|---|---|
| 25 | 6.48 | 3 | 3 |
| 26 | 4.86 | — | 7 |
| 27 | 6.48 | — | 6 |
| 28 | 8.10 | — | 5 |
| 29 | 6.48 | 0.5 | 5.5 |
| 30 | 6.48 | 1 | 5 |
| 31 | 6.48 | 1.5 | 4.5 |
| 32 | 6.48 | 2 | 4 |

TABLE IIIB

| Example No. | Appearance | Resistivity (ohms × 10⁴) |
|---|---|---|
| 25 | Clear amber glass | 70 |
| 26 | Light amber clear if quenched, crystalline if not | 2 |
| 27 | Clear amber glass | 150 |
| 28 | Dark amber glass | — |
| 29 | Clear amber glass | 300 |
| 30 | " | 50 |
| 31 | Clear light amber glass | 50 |
| 32 | " | 25 |

Table IV reports two compositions, expressed in weight percent on the oxide basis as calculated from the batch, of stable glasses consisting of more than three components. Table IVA recites the batch constituents employed, expressed in parts by weight. The glasses are stable and exhibit high electrical conductivity.

Melting of the batch ingredients and forming of the molten batches were carried out in accordance with the procedure outlined above for the exemplary compositions of Table I. Table IVB notes visual observations made on the glass specimens along with electrical resistivity measurements made with a Simpson ohm-meter.

TABLE IV

| Example No. | $P_2O_5$ | $Cu_2O$ | CuO | CuBr |
|---|---|---|---|---|
| 33 | 40 | 15 | 5 | 40 |
| 34 | 30 | 15 | 15 | 40 |

TABLE IVA

| Example No. | $Cu_2O$ | CuO | CuBr | $NH_4H_2PO_4$ |
|---|---|---|---|---|
| 33 | 1.5 | 0.5 | 4 | 6.48 |
| 34 | 1.5 | 1.5 | 4 | 4.86 |

TABLE IVB

| Example No. | Appearance | Resistivity (ohms × 10⁴) |
|---|---|---|
| 33 | Clear amber glass | 70 |
| 34 | Clear dark amber if quenched, crystalline if not | 5 |

Chemical analyses were performed upon nine of the above glasses to determine the effect of volatilization. The analyses were reported in terms of $Cu_2O$, $P_2O_5$, and halide. Table V compares the theoretical compositions as calculated from the batch with the analyzed values. The compositions are adjusted to 100% by weight.

TABLE V

| Example No. | Theoretical | | | | | Analyzed | | | | |
|---|---|---|---|---|---|---|---|---|---|---|
| | $P_2O_5$ | $Cu_2O$ | Cl | Br | I | $P_2O_5$ | $Cu_2O$ | Cl | Br | I |
| 4 | 38.8 | 47.4 | 13.8 | — | — | 42.8 | 51.7 | 5.5 | — | — |
| 5 | 38.5 | 44.5 | 17.0 | — | — | 49.5 | 46.1 | 4.4 | — | — |
| 8 | 33.3 | 44.8 | 21.9 | — | — | 41.1 | 52.8 | 6.1 | — | — |
| 14 | 28.7 | 41.9 | — | 29.4 | — | 34.7 | 42.5 | — | 22.8 | — |
| 17 | 38.5 | 36.2 | — | 25.3 | — | 50.7 | 38.9 | — | 10.4 | — |
| 18 | 34.1 | 48.8 | — | 17.1 | — | 33.5 | 47.8 | — | 18.7 | — |
| 26 | 29.2 | 25.5 | — | — | 45.3 | 35.3 | 38.1 | — | — | 26.6 |
| 31 | 39.3 | 31.3 | — | — | 29.4 | 45.2 | 37.1 | — | — | 17.7 |
| 32 | 39.4 | 34.4 | — | — | 26.2 | 40.1 | 38.3 | — | — | 21.6 |

One important finding resulting from the chemical analysis of the copper-containing glasses is that the analyzed concentration of cuprous copper is essentially equivalent to the total copper concentration. The level of $Cu^o$ was too low to analyze but this circumstance does not rule out the presence of colloidal copper in trace amounts to act as a colorant. The primary loss through volatilization was halide with the chloride loss being greater than that of bromide or iodide.

Table VI recites the analyzed values of the Examples listed in Table V approximated in terms of mole percent.

TABLE VI

| Example No. | $P_2O_5$ | $Cu_2O$ | Cl | Br | I |
|---|---|---|---|---|---|
| 4 | 30.4 | 44.6 | 19.1 | — | — |
| 5 | 44.0 | 40.6 | 15.6 | — | — |
| 8 | 35.0 | 44.3 | 20.7 | — | — |
| 14 | 29.6 | 36.0 | — | 34.5 | — |

TABLE VI-continued

| Example No. | $P_2O_5$ | $Cu_2O$ | Cl | Br | I |
|---|---|---|---|---|---|
| 17 | 47.2 | 36.0 | — | 17.2 | — |
| 18 | 29.3 | 41.7 | — | 29.2 | — |
| 26 | 34.2 | 36.7 | — | — | 34.5 |
| 31 | 44.4 | 36.7 | — | — | 19.6 |
| 32 | 39.2 | 37.2 | — | — | 23.6 |

Table VII records several compositions, expressed in weight percent on the oxide basis as calculated from the batch, of stable glasses having electrical resistivities at room temperature less than about $10^8$ ohm cm coming within the quadrangle ABCD cited in FIG. 5. The batch materials consisted of $AG_2O$, AgC, and $H_3PO_4$ (85% by weight).

The melting of the batch constituents and the forming of the resulting melt were undertaken in like manner to the description above with respect to the compositions of Table I. Table VIIA records visual observations noted on the glass specimens and electrical resistivity measurements conducted at room temperature via the probes of a Simpson ohm-meter.

TABLE VII

| Example No. | $P_2O_5$ | $Ag_2O$ | AgCl |
|---|---|---|---|
| 33 | 34.2 | 55.8 | 10 |
| 34 | 32.3 | 52.7 | 15 |
| 35 | 30.4 | 49.6 | 20 |
| 36 | 26.6 | 43.4 | 30 |
| 37 | 24.7 | 40.3 | 35 |
| 38 | 22.8 | 37.2 | 40 |
| 39 | 25 | 45 | 30 |
| 40 | 22.5 | 47.5 | 30 |
| 41 | 20 | 50 | 30 |
| 42 | 17.5 | 52.5 | 30 |
| 43 | 15 | 55 | 30 |
| 44 | 12.5 | 57.5 | 30 |
| 45 | 25 | 10 | 65 |
| 46 | 25 | 53 | 22 |
| 47 | 25 | 50 | 25 |
| 48 | 15 | 45 | 40 |
| 49 | 20 | 40 | 40 |

TABLE VIIA

| Example No. | Appearance | Resistivity (ohms × $10^4$) |
|---|---|---|
| 33 | Pale yellow clear if quenched, crystalline if not | 2000 |
| 34 | Pale yellow clear if quenched, crystalline if not | 1000 |
| 35 | Pale yellow clear if quenched, crystalline if not | 500 |
| 36 | Pale yellow clear glass | — |
| 37 | Clear glass if quenched, crystalline if not | |
| 38 | Clear glass if quenched, crystalline if not | 500 |
| 39 | Clear pale yellow if quenched, hazy if not | 300 |
| 40 | Clear pale yellow if quenched, hazy if not | 300 |
| 41 | Clear yellow glass | 200 |
| 42 | Clear amber glass | 150 |
| 43 | Clear yellow if quenched, crystalline if not | 70 |
| 44 | Clear yellow if quenched, crystalline if not | 150 |
| 45 | Clear if quenched, hazy crystalline if not | — |
| 46 | Clear if quenched, hazy if not, yellow | 500 |
| 47 | Clear if quenched, hazy if not, yellow | 500 |
| 48 | Clear if quenched, crystaline if not, yellow | 40 |
| 49 | Clear if quenched, crystalline if not, yellow | 30 |

Table VIII reports several compositions, expressed in weight percent on the oxide basis as calculated from the batch, of stable glasses exhibiting electrical resistivities determined at room temperature of less than about $10^8$ ohm cm within the quadrangle ABCD represented in FIG. 6. The batch materials consisted of $Ag_2O$, AgBr, and 85% $H_3PO_4$.

The melting of the batch components and the forming of the resulting molten mass were conducted in accordance with the description outlined above with regard to the compositions of Table I. Table VIIIA lists visual observations noted on the glass samples and electrical resistivity measurements made at room temperature utilizing a Simpson ohm-meter.

TABLE VIII

| Example No. | $P_2O_5$ | $Ag_2O$ | AgBr |
|---|---|---|---|
| 50 | 23 | 67 | 10 |
| 51 | 20.4 | 59.6 | 20 |
| 52 | 17.8 | 52.2 | 30 |
| 53 | 12.8 | 37.2 | 50 |
| 54 | 17 | 53 | 30 |
| 55 | 16 | 54 | 30 |
| 56 | 15 | 55 | 30 |
| 57 | 14 | 56 | 30 |
| 58 | 22 | 68 | 10 |
| 59 | 12 | 38 | 50 |
| 60 | 11 | 39 | 50 |
| 61 | 10 | 40 | 50 |
| 62 | 14 | 45 | 40 |
| 63 | 20 | 40 | 40 |

TABLE VIIIA

| Example No. | Appearance | Resistivity (ohms × $10^4$) |
|---|---|---|
| 50 | Clear light yellow glass | 500 |
| 51 | Clear yellow glass | 200 |
| 52 | " | 100 |
| 53 | " | 15 |
| 54 | " | 70 |
| 55 | Clear yellow is quenched, crystalline if not | 50 |
| 56 | Clear yellow is quenched, hazy if not | 50 |
| 57 | Clear yellow if quenched, crystalline if not | 200 |
| 58 | Clear yellow if quenched, crystalline if not | 500 |
| 59 | Clear brown glass | 20 |
| 60 | Clear yellow glass | 20 |
| 61 | Clear yellow if quenched, crystalline if not | 20 |
| 62 | Clear yellow glass | 50 |
| 63 | " | 50 |

Table IX lists a number of compositions, expressed in weight percent on the oxide basis as calculated from the batch, of stable glasses having electrical resistivities measured at room temperature of less than about $10^8$ ohm cm within the area ABCDE represented in FIG. 7. The batch materials consisted of $Ag_2O$, AgI, and 85% $H_3PO_4$.

The melting of the batch constituents and the forming of the melts were undertaken in the same way as that described above with respect to the compositions of Table I. Table IXA reports the visual appearance observed on the glass specimens and electrical resistivity determinations conducted at room temperature employing a Simpson ohm-meter.

TABLE IX

| Example No. | $P_2O_5$ | $Ag_2O$ | AgI |
|---|---|---|---|
| 64 | 20 | 40 | 40 |
| 65 | 15 | 25 | 60 |
| 66 | 15 | 35 | 50 |
| 67 | 18 | 32 | 50 |
| 68 | 26 | 44 | 30 |
| 69 | 15 | 55 | 30 |
| 70 | 24 | 26 | 50 |
| 71 | 14 | 45 | 40 |
| 72 | 25 | 35 | 40 |
| 73 | 15 | 20 | 60 |
| 74 | 10 | 30 | 60 |
| 75 | 20 | 20 | 60 |
| 76 | 20 | 60 | 20 |
| 77 | 10 | 50 | 40 |
| 78 | 30 | 20 | 50 |
| 79 | 10 | 40 | 50 |
| 80 | 35 | 25 | 40 |
| 81 | 35 | 35 | 30 |
| 82 | 45 | 25 | 30 |

TABLE IXA

| Example No. | Appearance | Resistivity (ohms × 10⁴) |
|---|---|---|
| 64 | Clear orange glass | 10 |
| 65 | Clear yellow glass | 0.02 |
| 66 | Clear yellow if quenched, crystalline if not | 0.1 |
| 67 | Clear light amber glass | 2 |
| 68 | Clear yellow glass if quenched, hazy if not | 70 |
| 69 | Clear amber glass | 30 |
| 70 | Clear yellow glass | 0.1 |
| 71 | Clear yellow glass if quenched, translucent if not | 0.4 |
| 72 | Clear yellow glass | — |
| 73 | Clear yellow glass if quenched, crystalline if not | 0.01 |
| 74 | Clear orange glass | 0.07 |
| 75 | Clear orange glass if quenched, crystalline if not | 0.02 |
| 76 | Clear orange glass if quenched, translucent if not | 150 |
| 77 | Clear yellow glass if quenched, crystalline if not | 0.05 |
| 78 | Clear dark amber if quenched, crystalline if not | 10 |
| 79 | Clear orange glass | 5 |
| 80 | Clear light yellow if quenched, hazy if not | 10 |
| 81 | Clear yellow glass | 200 |
| 82 | Pale yellow glass if quenched, translucent if not | 200 |

Table X records several stable glasses in the $Ag_2O$-mixed halide-$P_2O_5$ systems where the batches were precipitated in the known manner from aqueous solutions of $NaPO_3$, $AgNO_3$, NaCl, NaBr, and NaI, dried, and then melted to a glass. The values reported are expressed in weight percent on the oxide basis as calculated from the batch. Table XA recites the batch materials in terms of parts by weight.

The melting of the batch ingredients and the forming of the molten batches were carried out in the same fashion as described above with respect to the compositions of Table I. Table XB reports the visual appearance observed and the electrical resistivities measured at room temperature with a Simpson ohm-meter.

TABLE X

| Example No. | $P_2O_5$ | $Ag_2O$ | AgCl | AgBr | AgI |
|---|---|---|---|---|---|
| 84 | 30.4 | 49.6 | 8.4 | — | 11.6 |
| 84 | 12 | 58 | 12.6 | — | 17.4 |
| 85 | 16 | 54 | 12.6 | — | 17.4 |
| 86 | 27.6 | 42.4 | — | 10 | 20 |
| 87 | 28.5 | 46.5 | 15 | 10 | — |
| 88 | 28.5 | 46.5 | 15 | — | 10 |
| 89 | 28.5 | 46.5 | 15 | 5 | 5 |
| 90 | 26.6 | 43.4 | 20 | 5 | 5 |

TABLE XA

| Example No. | $NaPO_3$ | $AgNO_3$ | NaCl | NaBr | NaI |
|---|---|---|---|---|---|
| 83 | 21.85 | 45.60 | 1.80 | — | 3.60 |
| 84 | 6.96 | 45.87 | 2.02 | — | 4.45 |
| 85 | 9.28 | 42.71 | 2.02 | — | 4.45 |
| 86 | 4.00 | 8.57 | — | 0.55 | 1.28 |
| 87 | 10.88 | 13.69 | 0.62 | 0.55 | — |
| 88 | 10.88 | 13.51 | 0.62 | — | 0.64 |
| 89 | 10.88 | 13.60 | 0.62 | 0.28 | 0.32 |
| 90 | 10.15 | 13.46 | 0.82 | 0.28 | 0.32 |

TABLE XB

| Example No. | Appearance | Resistivity (ohms × 10⁴) |
|---|---|---|
| 83 | Clear glass | — |
| 84 | " | — |
| 85 | " | — |
| 86 | Hazy yellow glass | 100 |
| 87 | Clear if quenched, crystalline if not | 1000 |
| 88 | Clear if quenched, crystalline if not | 1000 |
| 89 | Clear if quenched, crystalline if not | 1000 |
| 90 | Clear if quenched, crystaline if not | 500 |

Table XI lists several exemplary compositions, expressed in mole percent on the oxide basis as calculated from the batch, wherein various additives were included in the base $P_2O_5$-$Ag_2O$-X system, wherein X is selected from the group of Cl, Br, and I. The glasses were prepared in the following manner. Appropriate amounts of $AgNO_3$ and $H_3PO_4$ were blended together and the mixture heated to about 200° C., at which time the $AgNO_3$ melted and a clear, colorless, homogeneous solution resulted. Upon further heating, viz., up to 500° C., water and nitrogen oxide fumes were evolved. The resultant melt was heated to about 700° C. and held at that temperature for about one hour to insure removal of water and the nitrogen oxides. A $AgPO_3$ glass was formed by pouring the melt onto a stainless steel block. The glass was annealed at 160° C.

An appropriate amount of a silver halide was then mixed with a comminuted sample of th $AgPO_3$ glass and the mixture fused at about 450° C. The additive materials were then dissolved in the molten mass. To prepare glasses containing BaO, ZnO, $La_2O_3$, desired amounts of the hydrated forms of the nitrates of those oxides were added slowly to the molten $Ag_2O$-$P_2O_5$-X. A vigorous reaction ensued with oxides of nitrogen as well as water being emitted. The addition of such constituents as $B_2O_3$, $Al_2O_3$, and LiF can be made by simply incorporating them in that form into the molten $Ag_2O$-$P_2O_5$-X. The resultant $Ag_2O$-$P_2O_5$-X additive oxide glasses are generally yellow in color.

TABLE XI

| Example No. | Ag$_2$O | P$_2$O$_5$ | AgCl | Additive Oxide |
|---|---|---|---|---|
| 92 | 43.1 | 43.1 | 11.0 | 2.8 La$_2$O$_3$ |
| 93 | 43.2 | 43.2 | 9.6 | 4.0 Y$_2$O$_3$ |
| 94 | 40 | 40 | 10 | 10 ZnO |
| 95 | 40.7 | 40.7 | 14.3 | 7.3 BaO |
| 96 | 40.4 | 40.4 | 10 | 9.2 ZnO |

Table XII records electrical resistivity determinations measured at room temperature utilizing a Simpson ohm-meter. Finally, transition temperature determinations via differential thermal analysis, and refractive index measurements are recited.

TABLE XII

| Example No. | Resistivity (ohms) | T$_g$ | n$_D$ |
|---|---|---|---|
| 92 | 9.3 × 10$^5$ | — | — |
| 93 | 1.3 × 10$^8$ | — | — |
| 94 | 1.4 × 10$^8$ | — | — |
| 95 | — | 178° C. | 1.725 |
| 96 | — | 170° C. | 1.720 |

Table XIII sets forth a group of compositions, expressed in weight percent on the oxide basis as calulated from the batch, of stable glasses falling within area ABCDEF of FIG. 8 along with a visual description of the glass prepared. Melting of the batch ingredients and forming of the molten batches were carried out in a manner similar to that described above with respect to the working examples of Table I. That is, the batches were compounded, placed into 96 percent silica crucibles, and melted for about 10 minutes at 900° C. The melts were poured onto a steel slab and quenched under the pressure of a graphite block into a thin plate of about 1 mm thickness. The batch materials employed were NH$_4$H$_2$PO$_4$, CuF$_2$, and NH$_4$F.HF.

Table XIIIA reports the compositions as calculated in terms of mole percent and also includes electrical resistivity measurements (ohm cm) conducted at room temperature (~25° C.) at 120 Hz, 1 KHz, and 10 KHz utilizing painted silver electrodes.

TABLE XIII

| Example No. | Cu$_2$O | P$_2$O$_5$ | F | Visual Appearance |
|---|---|---|---|---|
| 97 | 12 | 77 | 11 | Dark glass |
| 98 | 16 | 37 | 47 | Dark glass |
| 99 | 5 | 90 | 5 | Dark, sticky glass |
| 100 | 7 | 83 | 10 | Dark, sticky glass |
| 101 | 6 | 77 | 17 | Dark, sticky glass |
| 102 | 18 | 76 | 6 | Dark glass |
| 103 | 53 | 39 | 8 | Dark, partly devitrified glass |

TABLE XIIIA

| Example No. | Cu$_2$O | P$_2$O$_5$ | F | 120Hz | 1KHz | 10KHz |
|---|---|---|---|---|---|---|
| 97 | 7 | 45 | 48 | 7 × 10$^7$ | 6.8 × 10$^7$ | 5.8 × 10$^7$ |
| 98 | 4 | 9 | 87 | — | — | 2.6 × 10$^7$ |
| 99 | 4 | 68 | 28 | 6.6 × 10$^5$ | 6.3 × 10$^5$ | 6.1 × 10$^5$ |
| 100 | 4 | 50 | 46 | 1.9 × 10$^6$ | 1.9 × 10$^6$ | 6.5 × 10$^5$ |
| 101 | 3 | 37 | 60 | 1.3 × 10$^7$ | 1.3 × 10$^7$ | 1.1 × 10$^7$ |
| 102 | 13 | 56 | 31 | — | — | 4.9 × 10$^7$ |
| 103 | 34 | 25 | 41 | — | — | 5.8 × 10$^7$ |

Table XIV lists a number of compositions, reported in terms of weight percent on the oxide basis as calculated from the batch, of relatively stable glasses encompassed within the area ABCDEF of FIG. 9 accompanied with a visual description of each glass prepared. The melting of the batch ingredients and the forming of the resultant melt were undertaken in like manner to that described immediately above with regard to Table XIII. The batch ingredients included NH$_4$H$_2$PO$_4$, CuF, CuCl, and NH$_4$F.HF. The quantities of the batch components were adjusted such that equal molar amounts of fluoride and chloride were present in the batch.

Table XIVA recites the compositions as calculated in terms of mole percent and lists electrical resistivity determinations (reported in ohm cm) measured at room temperature (~25° C.) at 120 Hz, 1 KHz, and 10 KHz utilizing painted silver electrodes.

TABLE XIV

| Example No. | Cu$_2$O | P$_2$O$_5$ | F | Cl | Visual Appearance |
|---|---|---|---|---|---|
| 104 | 55 | 34 | 3.8 | 7.2 | Light amber glass |
| 105 | 62 | 19 | 6.5 | 12.5 | Dark, partly devitrified glass |
| 106 | 41 | 25 | 11.5 | 21.5 | Yellow glass |
| 107 | 74 | 18 | 2.8 | 5.2 | Dark surface devitrified glass |
| 108 | 51 | 34 | 5.2 | 9.8 | Amber, partly devitrified glass |
| 109 | 56 | 19 | 8.7 | 16.3 | Dark glass |

TABLE XIVA

| Example No. | Cu$_2$O | P$_2$O$_5$ | F | Cl | 120Hz | 1KHz | 10KHz |
|---|---|---|---|---|---|---|---|
| 104 | 37 | 23 | 20 | 20 | 3.7 × 10$^5$ | 1.8 × 10$^5$ | 4.4 × 10$^4$ |
| 105 | 36 | 8 | 28 | 28 | 2.0 × 10$^3$ | 1.9 × 10$^3$ | 1.1 × 10$^3$ |
| 106 | 17 | 11 | 36 | 36 | 3.4 × 10$^3$ | 3.4 × 10$^3$ | 2.7 × 10$^3$ |
| 107 | 54 | 14 | 16 | 16 | 8.6 × 10$^4$ | 8.1 × 10$^4$ | 7.7 × 10$^4$ |
| 108 | 31 | 21 | 24 | 24 | 3.9 × 10$^4$ | 3.2 × 10$^4$ | 1.1 × 10$^4$ |
| 109 | 27 | 9 | 32 | 32 | 4.4 × 10$^4$ | 4 × 10$^4$ | 4 × 10$^4$ |

Table XV records exemplary glasses, stated in terms of weight percent on the oxide basis as calculated from the batch, of relatively stable glasses having compositions within the area ABCDEF of FIG. 10 and includes a visual description of each glass prepared. The melting of the batch materials and the forming of the molten batch into thin sheet were conducted in accordance with the method described with reference to Table XIII. NH$_4$H$_2$PO$_4$, CuF$_2$, CuBr, and NH$_4$F.HF comprised bath ingredients therefor. The quantities of chloride and fluoride were carefully controlled such that equal molar amounts of each were present in the batch.

Table XVA lists the glasses as calculated in terms of mole percent and also reports electrical resistivity data (expressed as ohm cm) measured at room temperature (~25° C.) at 120Hz, 1KHz, and 10KHz utilizing painted silver electrodes.

TABLE XV

| Example No. | Cu$_2$O | P$_2$O$_5$ | F | Br | Visual Appearance |
|---|---|---|---|---|---|
| 110 | 46 | 34 | 3.8 | 16.2 | Yellow, sticky glass |
| 111 | 47 | 19 | 6.3 | 27.7 | Amber glass |
| 112 | 24 | 46 | 5.4 | 24.6 | Amber glass |
| 113 | 36 | 28 | 6.9 | 20.1 | Yellow-green glass |
| 114 | 17 | 58 | 4.8 | 20.2 | Dark glass |
| 115 | 74 | 18 | 1.5 | 6.5 | Dark glass |
| 116 | 51 | 34 | 3 | 12 | Yellow, amber sticky glass |
| 117 | 56 | 19 | 5 | 20 | Red, amber glass |
| 118 | 31 | 48 | 4 | 17 | Amber glass |

TABLE XVA

| Example No. | $Cu_2O$ | $P_2O_5$ | F | Br | 120Hz | 1KHz | 10KHz |
|---|---|---|---|---|---|---|---|
| 110 | 33 | 25 | 21 | 21 | $1.9 \times 10^4$ | $1.5 \times 10^4$ | $9.5 \times 10^3$ |
| 111 | 29 | 11 | 30 | 30 | $1.3 \times 10^3$ | $2.6 \times 10^3$ | $3.5 \times 10^3$ |
| 112 | 16 | 32 | 26 | 26 | $3.1 \times 10^7$ | $2.7 \times 10^7$ | $1.6 \times 10^7$ |
| 113 | 21 | 17 | 31 | 31 | $4.9 \times 10^3$ | $2.5 \times 10^3$ | $1.2 \times 10^3$ |
| 114 | 12 | 40 | 24 | 24 | — | — | $1.4 \times 10^7$ |
| 115 | 64 | 16 | 10 | 10 | $4.1 \times 10^5$ | $4.1 \times 10^5$ | $4.0 \times 10^5$ |
| 116 | 40 | 27 | 17 | 17 | $6 \times 10^4$ | $3.6 \times 10^4$ | $2.7 \times 10^4$ |
| 117 | 40 | 14 | 23 | 23 | $2.2 \times 10^3$ | $2.0 \times 10^3$ | $1.7 \times 10^3$ |
| 118 | 17 | 37 | 23 | 23 | $1.0 \times 10^7$ | $9.8 \times 10^6$ | $7.7 \times 10^6$ |

Table XVI lists a number of working examples, recorded in terms of weight percent on the oxide basis as calculated from the batch, of relatively stable glasses having compositions included within the area ABCDEF of FIG. 11 along with a visual description of each glass body. The melting of the batch materials and the pressing of the melt into thin sheet were carried out in a manner similar to that described above with respect to Table XIII. The batch ingredients for the glasses included $NH_4H_2PO_4$, $CuF_2$, CuI, and $NH_4F \cdot HF$. The contents of fluoride and iodide were so controlled as to incorporate equal molar amounts of each into the batch.

Table XVIA recites the glasses as calculated in terms of mole percent and also tabulates electrical resistivity determinations (reported in ohm cm) measured at room temperature (~25° C.) at 120Hz, 1KHz, and 10KHz employing painted silver electrodes.

TABLE XVI

| Example No. | $Cu_2O$ | $P_2O_5$ | F | I | Visual Appearance |
|---|---|---|---|---|---|
| 119 | 74 | 18 | 1 | 7 | Dark glass |
| 120 | 51 | 34 | 2 | 13 | Red-brown, partly devitrified glass |
| 121 | 56 | 19 | 3.2 | 21.8 | Dark amber glass |
| 122 | 31 | 47 | 2.7 | 19.3 | Light amber glass |
| 123 | 26 | 32 | 5.4 | 36.6 | Amber, surface devitrified glass |
| 124 | 13 | 76 | 1.5 | 9.5 | Dark brown glass |

TABLE XVIA

| Example No. | $Cu_2O$ | $P_2O_5$ | F | I | 120Hz | 1KHz | 10KHz |
|---|---|---|---|---|---|---|---|
| 119 | 69 | 17 | 7 | 7 | $9.8 \times 10^5$ | $9.2 \times 10^5$ | $8.6 \times 10^5$ |
| 120 | 45 | 29 | 13 | 13 | $3.0 \times 10^5$ | $1.7 \times 10^5$ | $9.0 \times 10^4$ |
| 121 | 45 | 15 | 20 | 20 | $2.4 \times 10^4$ | $2.2 \times 10^4$ | $2.0 \times 10^4$ |
| 122 | 26 | 40 | 17 | 17 | $2.6 \times 10^5$ | $2.1 \times 10^5$ | $1.7 \times 10^5$ |
| 123 | 18 | 24 | 29 | 29 | $2.2 \times 10^6$ | $1.3 \times 10^6$ | $1 \times 10^6$ |
| 124 | 12 | 68 | 10 | 10 | — | — | $1.4 \times 10^7$ |

Table XVII reports several other glasses, expressed in weight percent on the oxide basis as calculated from the batch, having compositions within the base $P_2O_5$-$Ag_2O$-X system, wherein X is selected from the group of Cl, Br, I, and equal molar amounts of Cl and I. The glasses were prepared in like manner to that described above with respect to the examples listed in Table XI except that no additive oxides were incorporated therein. Table XVII also records d.c. electrical resistivity measurements conducted at room temperature (~25° C.) utilizing the three probe method.

TABLE XVII

| Example No. | $Ag_2O$ | $P_2O_5$ | AgCl | AgBr | AgI | Resistivity (ohm cm × $10^4$) |
|---|---|---|---|---|---|---|
| 125 | 59.7 | 36.5 | 3.8 | — | — | 173 |
| 126 | 57.2 | 35.1 | 7.7 | — | — | 73 |
| 127 | 54.8 | 33.5 | 11.7 | — | — | 49 |
| 128 | 52.1 | 31.9 | 16.0 | — | — | 26 |
| 129 | 46.5 | 28.5 | 25.0 | — | — | 8.6 |
| 130 | 41.1 | 25.2 | 33.7 | — | — | 3.2 |
| 131 | 58.9 | 26.1 | — | 5.0 | — | 152 |
| 132 | 52.7 | 32.3 | — | 15.0 | — | 41 |
| 133 | 37.1 | 22.8 | — | 40.1 | — | 2.7 |
| 134 | 57.9 | 35.8 | — | — | 6.3 | 81 |
| 135 | 50.9 | 31.1 | — | — | 18.0 | 27 |
| 136 | 23.1 | 15.2 | — | 25.0 | 2.7 | |
| 137 | 41.2 | 25.3 | 12.7 | — | 20.8 | 2.2 |
| 138 | 44.2 | 27.2 | 10.8 | — | 17.8 | 8.6 |
| 139 | 51.6 | 31.6 | 6.4 | 10.4 | 29.8 | |

We claim:

1. Cuprous copper and/or silver halophosphate glasses having softening points less than about 400° C., coefficients of thermal expansion (25°-300° C.) in excess of about 180 × $10^{-7}$/° C., and electrical resistivities when measured at room temperature of less than about $10^8$ ohm cm, said glasses consisting essentially of the stated proportions, expressed in terms of weight percent on the oxide basis as calculated from the batch, selected from the groups of:
   (a) compositions defined by area ABCD of FIG. 1;
   (b) compositions defined by area ABCD of FIG. 2;
   (c) compositions defined by area ABCDE of FIG. 3;
   (d) compositions containing at least 1% chloride and defined by area ABCD of FIG. 5;
   (e) compositions containing at least 1% bromide and defined by area ABCD of FIG. 6;
   (f) compositions containing at least 1% iodide and defined by area ABCDE of FIG. 7;
   (g) compositions defined by area ABCDEF of FIG. 8;
   (h) compositions defined by area ABCDEF of FIG. 9;
   (i) compositions defined by area ABCDEF of FIG. 10;
   (j) compositions defined by area ABCDEF of FIG. 11.

2. Cuprous copper and/or silver halophosphate glasses according to claim 1 wherein a combination of two or three halides may be present in the compositions of the groups (a)–(j).

3. Cuprous copper and/or silver halophosphate glasses according to claim 1 wherein copper is substituted in part for silver and vice versa in the compositions of groups (a)–(j).

4. Silver halophosphate glasses according to claim 1 wherein the chloride content of the group (d) compositions is at least 5%.

5. Silver halophosphate glasses according to claim 1 wherein the bromide content of the group (e) compositions is at least 5%.

6. Silver halophosphate glasses according to claim 1 wherein the iodide content of the group (f) compositions is at least 5%.

7. Cuprous copper halophosphate glasses according to claim 1 exhibiting thermochromic behavior consisting essentially of the state proportions, expressed in weight percent on the oxide basis as calculated from the batch, selected from the groups of:
   (a) compositions defined by the area ABCD of FIG. 1;
   (b) compositions defined by the area ABCD of FIG. 2; and
   (c) compositions defined by the area ABCDE of FIG. 3.

* * * * *

UNITED STATES PATENT AND TRADEMARK OFFICE
CERTIFICATE OF CORRECTION

PATENT NO. : 4,226,628
DATED : October 7, 1980
INVENTOR(S) : Roger F. Bartholomew et al.

It is certified that error appears in the above-identified patent and that said Letters Patent are hereby corrected as shown below:

Column 2, line 65, change "resitivities" to -- resistivities --.

Column 3, line 54, change "$P_2O_5$ ps" to -- $P_2O_5$ --.

Column 4, line 21, change "enchance" to -- enhance --.

Column 6, line 49, change "Ag+ Ag°" to -- Ag+ to Ag° --.

Column 8, line 54, change "tenary" to -- ternary --.

Column 13, line 14, change "AgC" to --AgCl --.

Column 13, TABLE VIIA, line 68, change "crystaline" to -- crystalline --.

Column 14, TABLE VIIIA, line 46, change "is" to -- if --.

Column 14, TABLE VIIIA, line 48, change "is" to -- if --.

Column 16, TABLE X, line 4, change "84" to -- 83 --.

Column 16, TABLE XB, line 37, change "crystaline" to -- crystalline --.

Column 16, line 56, change "th" to -- the --.

Column 16, line 59, after "$La_2O_3$", insert -- and $Y_2O_3$--.

Column 18, line 46, change "bath" to -- batch --.

Column 20, TABLE XVII, line 13, change "23.1" to -- 36.7 --.

Column 20, TABLE XVII, line 13, change "15.2" to -- 23.1 --.

Column 20, TABLE XVII, line 13, change "——" to -- 15.2 --.

UNITED STATES PATENT AND TRADEMARK OFFICE
CERTIFICATE OF CORRECTION

PATENT NO. : 4,226,628
DATED : October 7, 1980
INVENTOR(S) : Roger F. Bartholomew et al.

It is certified that error appears in the above-identified patent and that said Letters Patent are hereby corrected as shown below:

Column 20, TABLE XVII, line 13, change "25.0" to -- --- --.

Column 20, TABLE XVII, line 13, change "2.7" to -- 25.0 --.

Column 20, TABLE XVII, line 13, change "---" to -- 2.7 --.

Column 20, TABLE XVII, line 15, change "10.4" to -- --- --.

Column 20, TABLE XVII, line 15, change "29.8" to -- 10.4 --.

Column 20, TABLE XVII, line 15, change "---" to -- 29.8 --.

Signed and Sealed this

Seventeenth Day of February 1981

[SEAL]

Attest:

Attesting Officer

RENE D. TEGTMEYER

Acting Commissioner of Patents and Trademarks